No. 646,109. Patented Mar. 27, 1900.
A. PALM.
VEHICLE WHEEL.
(Application filed Feb. 5, 1900.)
(No Model.)
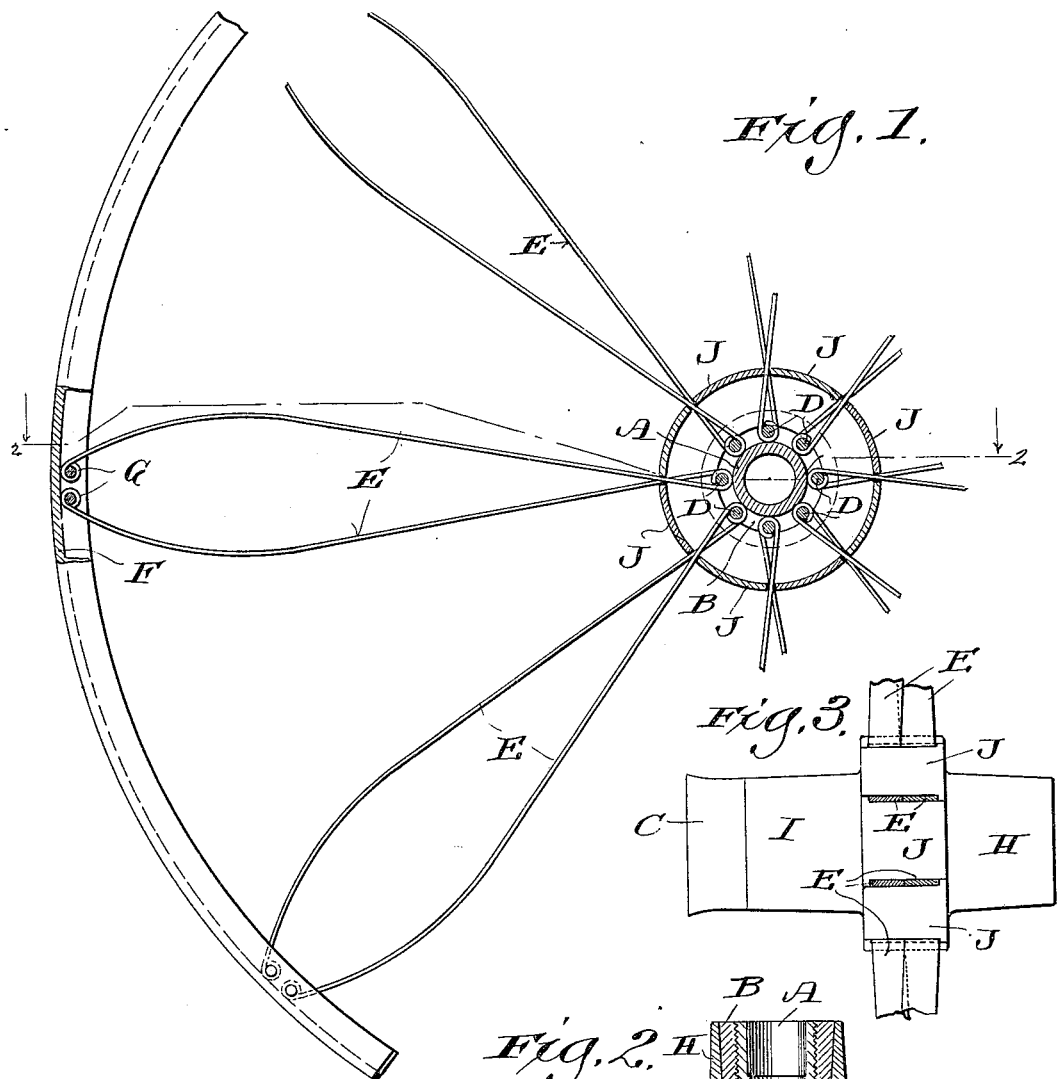

UNITED STATES PATENT OFFICE.

ANTON PALM, OF MILWAUKEE, WISCONSIN.

VEHICLE-WHEEL.

SPECIFICATION forming part of Letters Patent No. 646,109, dated March 27, 1900.

Application filed February 5, 1900. Serial No. 3,925. (No model.)

*To all whom it may concern:*

Be it known that I, ANTON PALM, a citizen of the United States, and a resident of Milwaukee, in the county of Milwaukee and State of Wisconsin, have invented certain new and useful Improvements in Vehicle-Wheels; and I do hereby declare that the following is a full, clear, and exact description thereof.

My invention relates to that variety of elastic vehicle-wheels set forth in my Patent No. 580,216, issued April 6, 1897, and has for its object to simplify and cheapen such wheels, as well as to increase their resiliency, said invention consisting in certain peculiarities of construction and combination of parts, hereinafter particularly described with reference to the accompanying drawings and subsequently claimed.

Figure 1 of the drawings represents a side view of a portion of my improved wheel, partly in section; Fig. 2, a horizontal section of the same on the plane indicated by line 2 2 in the first figure; Fig. 3, a view illustrating the wheel-hub in front elevation, some of the spokes shown in this figure being broken and others in section; and Fig. 4, a perspective view of one of a pair of sections constituting part of said hub.

Referring by letter to the drawings, A indicates a straight metal sleeve that is exteriorly screw-threaded at both ends and constitutes the preferred form of axle-box for my improved elastic vehicle-wheel. Run on opposite ends of the aforesaid axle-box are nuts B C, and stay-pins D are arranged at intervals circumferentially of said axle-box, between the nuts. Each stay-pin D engages eyes formed by bending the inner ends of a pair of curved spring-metal spokes E, that cross each other and have their outer ends also bent to form eyes. The outer eyes of the spokes fit an inner groove in an annular rim F, and stay-pins G, having drive fit in side apertures of the rim, engage said eyes.

The curve of each spoke is opposite that of its mate on a stay-pin D, and in the wheel herein shown there are eight of the inner stay-pins, sixteen spokes, and sixteen of the other stay-pins G, the outer eye ends of each pair of spokes being near each other in order to obtain the best results and improve the appearance of the wheel.

Sleeves H I fit the nuts B C, and extending at right angles to a spoke-opposing flange of each sleeve are a series of segmental plates J, arranged at regular intervals apart to constitute spacers between the pairs of spokes. The flange of each sleeve is notched at intervals to form seats for the segmental plates extending from the flange of the opposite sleeve, and an annular shoulder of nut C opposes sleeve I to tighten the flanges of both sleeves against the opposing spokes, nut B and sleeve H being shown in wedge fit one within the other.

By bushing the sleeves and employing bolts to connect their flanges an ordinary axle-box may be substituted for the one herein shown provided with the nuts aforesaid.

Having thus described my invention, what I claim as new, and desire to secure by Letters Patent, is—

1. A vehicle-wheel comprising an axle-box, stay-pins at intervals circumferentially of the axle-box, curved spring-metal spokes that cross each other in pairs and have their inner ends bent to form eyes engaged by said pins, an annular rim having an inner groove engaged by the outer ends of the spokes also bent to form eyes, other stay-pins connecting the rim and outer eye ends of said spokes, sleeves concentric with said axle-box and having spoke-opposing flanges provided with right-angle extensions in the form of segmental plates constituting spacers between pairs of spokes, the plates of one flange being lapped on the opposite flange, and means for tightening said flanges against the aforesaid spokes.

2. A vehicle-wheel comprising an axle-box exteriorly screw-threaded at both ends, nuts engaging said ends of the axle-box, stay-pins arranged circumferentially of said axle-box between the nuts, curved spring-metal spokes that cross each other in pairs and have their inner ends bent to form eyes engaged by said stay-pins, an annular rim having an inner groove engaged by the outer ends of the spokes also bent to form eyes, other stay-pins connecting the rim and outer eye ends of said spokes, and sleeves on the nuts having spoke-opposing flanges provided with right-angle extensions in the form of segmental plates constituting spacers between pairs of spokes, the plates of one flange being lapped on the opposite flange and said flanges tightened against the aforesaid spokes by means of said nuts.

In testimony that I claim the foregoing I have hereunto set my hand, at Milwaukee, in the county of Milwaukee and State of Wisconsin, in the presence of two witnesses.

ANTON PALM.

Witnesses:
N. E. OLIPHANT,
B. C. ROLOFF.